UNITED STATES PATENT OFFICE.

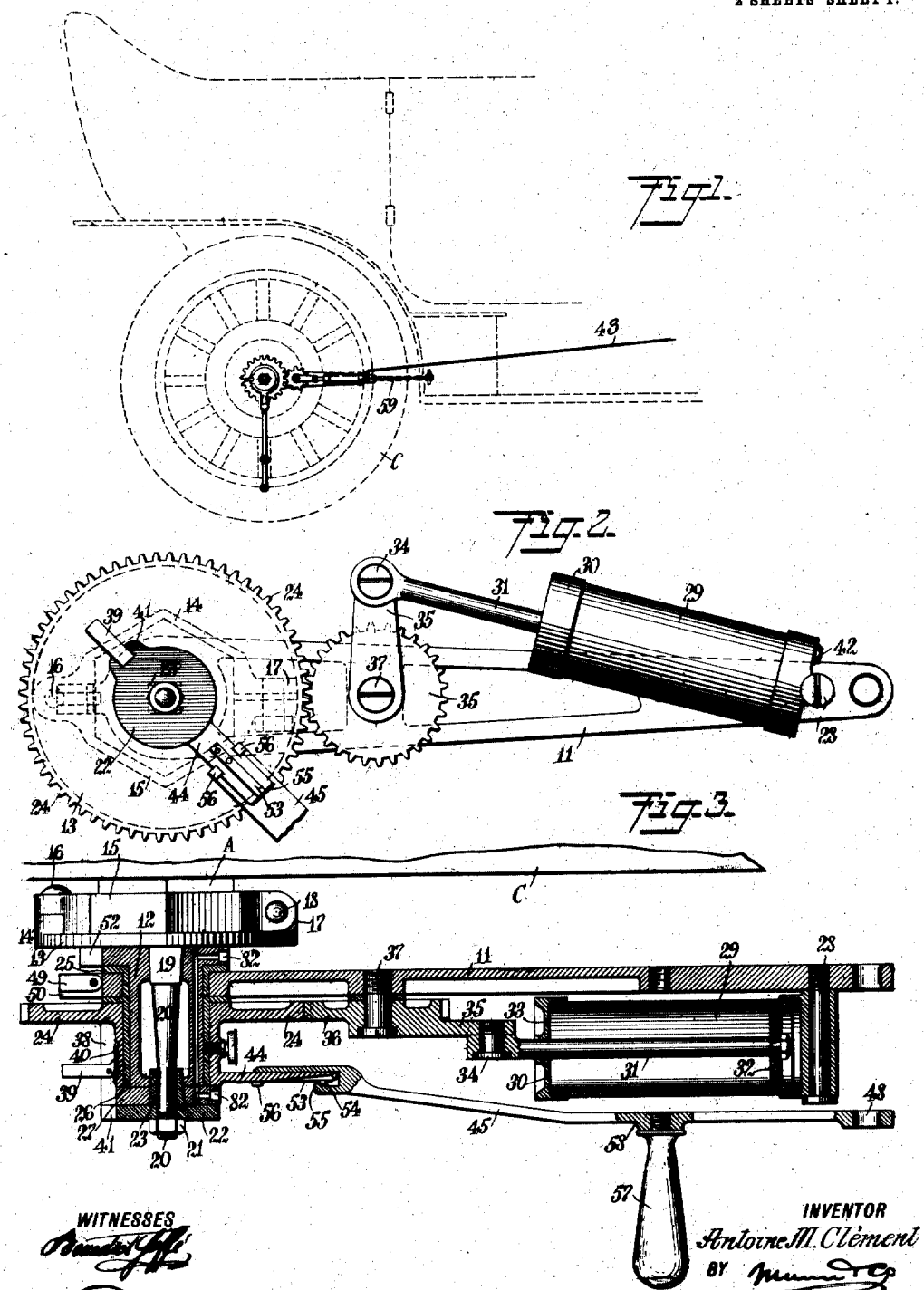

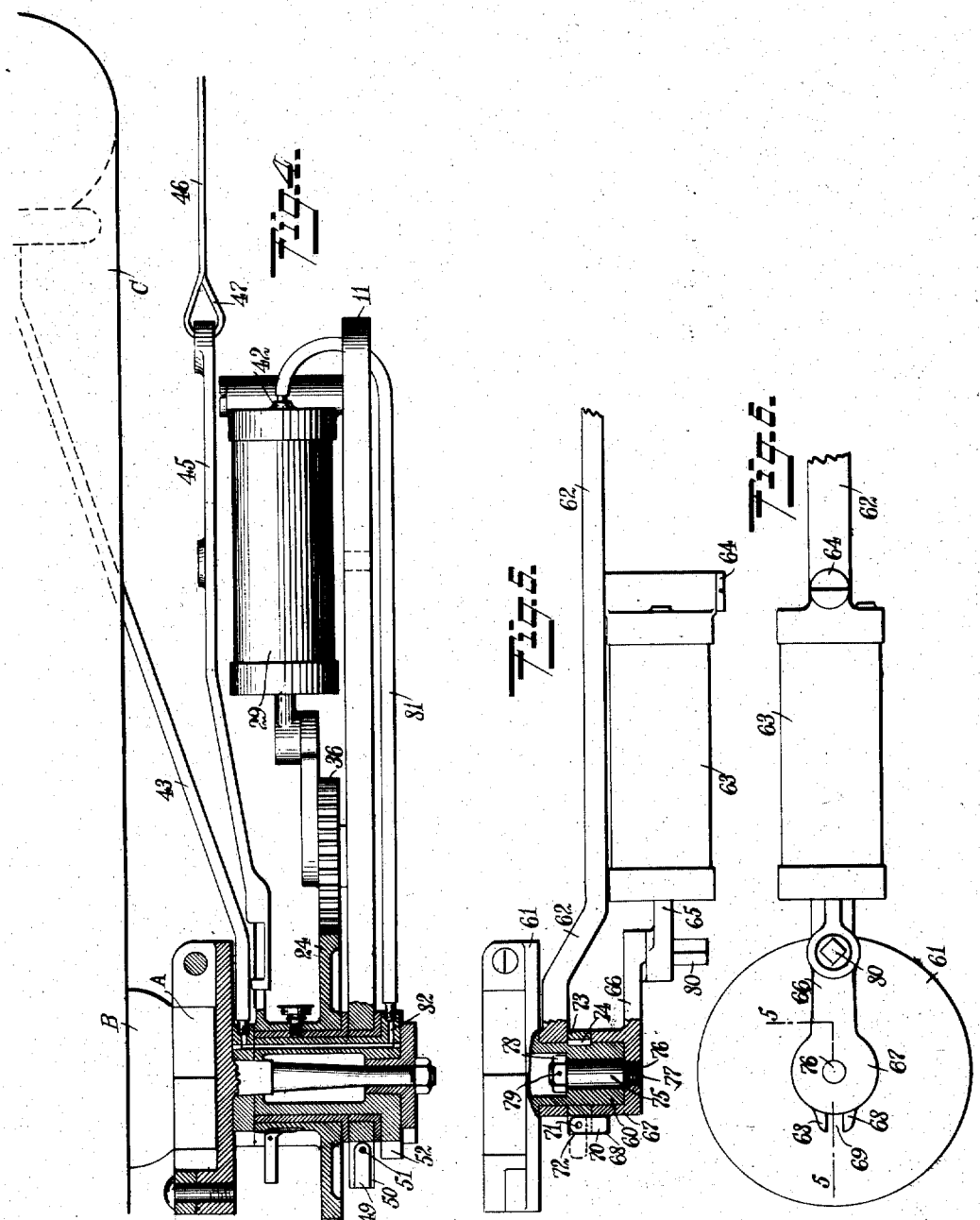

ANTOINE M. CLÉMENT, OF NEW YORK, N. Y.

AUTOMOBILE AIR-PUMP.

1,002,035.  Specification of Letters Patent.  Patented Aug. 29, 1911.

Application filed November 8, 1910. Serial No. 591,282.

*To all whom it may concern:*

Be it known that I, ANTOINE M. CLÉMENT, a citizen of the Republic of France, and a resident of the city of New York, borough of Manhattan, in the county and State of New York, have invented a new and Improved Automobile Air-Pump, of which the following is a full, clear, and exact description.

Among the principal objects which the present invention has in view are: to provide a pumping mechanism operatively attached to the driving axle of an automobile for inflating the tires of the wheels not directly connected with the pumping mechanism; to provide a pumping mechanism of the character described having auxiliary means for manually operating the same independent of the wheel and power driving mechanism of the automobile; to provide means connected with a pumping mechanism of the character described for utilizing the wheel of the automobile with which the pumping mechanism is operatively connected as a balancing or fly wheel for the pump when the same is manually operated; to provide auxiliary means for rigging a drum of the character described upon one of the driving wheels of an automobile to gyrate about the axle of said wheel when carried thereby to inflate the tire of the wheel on which it is mounted; and to simplify the construction of a mechanism of the character set forth to adapt the same for direct usage and to facilitate the ready and easy repair thereof.

One embodiment of the present invention is disclosed in the structure illustrated in the accompanying drawings, in which like characters of reference denote corresponding parts in all the views, and in which—

Figure 1 is a side elevation of a pump and driving mechanism therefor, constructed and arranged in accordance with the present invention, the pump being shown anchored to the body structure of the automobile, said body structure being shown in dotted lines; Fig. 2 is a side elevation, on an enlarged scale, of a pump and driving mechanism therefor, constructed and arranged in accordance with the present invention a fragment of the manually operated handle being shown; Fig. 3 is a longitudinal sectional view of a pump and driving mechanism therefor, constructed and arranged in accordance with the present invention, the moving members being disposed in straight line arrangement to facilitate the display of the drawing; Fig. 4 is a plan view, partly in section, of a pump and driving mechanism therefor, constructed and arranged in accordance with the present invention, showing the method of attaching the pump when utilized for inflating the tire of a wheel on which the pump is mounted; Fig. 5 is a plan view, partly in section, the section being taken on the line 5—5 in Fig. 6, showing a modified form of the invention; and Fig. 6 is a side view of the modified form of the invention shown in Fig. 5.

The present invention has in view the production of a pump and driving mechanism therefor adapted to a variety of uses, as will be hereinafter set forth. The pump and driving mechanism therefor are mounted upon a bracket plate 11. The bracket plate 11 is pivotally mounted upon a post 12, upon which is formed a fixed collar flange 14 and a pivoted collar flange 15. The collar flange 15 is pivoted to the flange 14 by means of a pivot pin 16 at one side of the plate 13, and is secured to a post 17 by means of a screw bolt 18, as shown best in Figs. 2 and 3 of the drawings. The collar flanges 14 and 15 are shaped interiorly to fit the wrench head A of a cap nut for holding the wheel on the axle of the automobile.

Where the cap nut of the automobile is unusual in size a special cap B, as shown in Fig. 4, is provided. The cap B has a wrench head A shaped in form and size to correspond with the standard wrench heads, while the screw portion of the cap B is enlarged or contracted to suit the screw thread of the hub to which it is to be attached. Where the purchaser of a pumping mechanism constructed and arranged in accordance with the present invention has an automobile, the cap nuts whereof do not fit the flanges 14 and 15, the discrepancy may be overcome by providing the special cap B.

The post 12 is held rigidly upon the plate 13 by means of a squared end 19 of the bolt 20. The external end of the bolt 20 is screw threaded to receive a nut 21. The nut 21 bears upon a key plate 22, the boss 23 of which is shaped to a square section, as seen in dotted lines in Fig. 2. The post 12 is chambered intermediate the ends thereof, and is turned to form a cylindrical body to provide a rotary bearing for the bracket plate 11 and a gear wheel 24. Bearing linings 25 and 26 are provided for the plate 11 and gear wheel 24, as shown best in Fig. 3 of the drawings. A collar 27 is mounted rigidly upon the post 12 by means of screws or other suitable fastening devices after the plate 11, gear wheel 24 and bearing linings therefor have been adjusted on the cylindrical section of the post 12. The collar 27 and the end of the chambered section of the post 12 are provided with square perforations to receive the squared boss 23. When the collar 27 is secured in position upon the post 12, the plate 11 and members connected therewith and the gear 24 are secured to the post 12 as one distinct machine element, which may be removed from the plate 13 and parts connected therewith by removing the nut 21 and plate 22 and lifting the said post 12 and parts connected therewith and the plate 22 from engagement with the nut 21. This operation is performed when, as will be hereinafter described and as shown in the accompanying drawings, the pump is disposed upon the wheel whose tire is being inflated at the time.

Pivotally mounted on the outer end of the plate 11, and by means of a pivot pin 28, is an air pump cylinder 29. The cylinder 29 is provided with a cap 30, through the cylindrical perforation wherein is passed a piston rod 31 whereon is mounted a piston 32. The piston 32 is constructed in the usual manner to provide a valve, the operation of which passes the air from the back of the said piston into the chamber forward of the piston, the air being admitted to the upper end of the cylinder 29 through a perforation 33, as seen best in Fig. 3 of the drawings. The piston rod 31 is secured pivotally by means of a screw 34 to a crank arm 35. The crank arm 35 is integrally formed with a gear wheel 36. The gear wheel 36 is rotatively mounted upon a screw bolt 37, and is meshed with the gear wheel 24.

When constructed as thus far described the pump is operated from the driving shaft of the automobile, and from the driving wheel thereon mounted. To connect the post 12 with the gear wheel 24 the hub of the gear wheel is provided with a grooved extension 38, in the groove whereof is pivotally mounted a latch arm 39. The latch arm 39 is held in position, operative or inoperative, by a flat spring 40. When the latch 39 is thrown from the position shown in Figs. 2 and 3 of the drawings to engage a groove 41 in the plate 22, the gear wheel 24 is compelled to rotate in unison with the plate 22, which is rotated by the post 12, plate 13 and flanges 14 and 15, these being secured fixedly to the driving wheel C of the automobile.

When the gear wheel 24 is rotated the gear wheel 36 is rotated to crank the piston rod 31 to reciprocate the piston 32 in the cylinder 29. The cylinder 29 and piston rod connected therewith oscillates on the pivot 28 and delivers the air from the said cylinder by means of an outlet nipple 42. The nipple 42 is usually connected by means of a flexible hose pipe 43 with the inner tube of one of the tires of one of the wheels of the automobile, said wheel being other than the wheel on which the pump is mounted when disposed as shown in Figs. 1 to 3 inclusive.

When it is desired to inflate the wheel upon which the cylinder 29 is mounted, the parts are disposed as shown in Fig. 4 of the drawings. To transfer the parts from the position shown in Figs. 1 to 3 inclusive to the position shown in Fig. 4, the nut 21 is removed and the post 12 and all the members connected therewith, including the plate 22, are removed from the bolt 20 and reversed end for end and replaced upon the said bolt 20, the plate 22 being omitted. The plate 22 is subsequently placed upon the bolt 20, the squared boss 23 of the said plate being inserted in the perforation formed in the post 12, which perforation formerly engaged the squared section 19 of the bolt 20. The nut 21 is then replaced and the pump is disposed as shown in Fig. 4 of the drawings.

To deliver the air from the cylinder 29 to the tire of the wheel on which the said pump is mounted, it becomes necessary for the plate 11 and parts mounted thereon to gyrate around the axis of the wheel C to maintain the relative relation between the pump and the hose pipe 43. To rotate the gear wheel 36 under these conditions it becomes necessary to hold in arrested position the gear wheel 24. It is for this purpose that there is extended from the side of the hub of the gear wheel 24 an arm 44.

The arm 44 serves a dual purpose, to wit, that of maintaining the stationary position of the gear wheel 24 and to form an engaging means for the hand lever 45. As shown in Fig. 4 of the drawings, the hand lever 45 is employed to hold the gear wheel 24 in stationary position, the lever being anchored by means of a rod 46 to the frame of the automobile. As shown, the lever 45 is connected to the rod 46 by an eyelet 47 of the said rod being passed through the perforation 48 formed in the end of the said lever 45. (See Figs. 3 and 4 of the drawings.)

To connect the plate 11 with the post 12 there is provided a latch 49 pivotally mounted in brackets 50. The latch 49 is pivoted at 51, and when rotated upon its pivots falls into a groove 52 provided in the base flange of the post 12, as best seen in Figs. 3 and 4 of the drawings. When the said latch 49 is disposed in the groove 52 the post 12 and the plate 11 are mutually locked, and the plate 22 and parts connected therewith are rotated about the axis of the wheel C.

The lever 45 is provided to supply a want for a hand manipulated pump. The construction as described, and particularly as shown in Figs. 1 to 3 inclusive, may be employed for hand manipulation by engaging the lever 45 with the arm 44. For this purpose the arm 44 is provided with a flat spring 53, having formed at the end thereof a latch head 54, which latch head 54 overstrikes a hooked end 55 formed on the inner end of the lever 45. The lever 45 is further provided with guide hooks 56, 56 by which it is guided as the lever 45 is slid over the arm 44. The lever 45 is provided with a hand grip 57, a screw threaded shank whereof is inserted in a tapped hole formed in a boss 58 intermediate the ends of the said lever. If it be desired the screw threaded end of the grip 57 may be extended to pass through the perforation 48 to receive a clamping screw nut at the opposite side of the lever 45.

If the conditions of operation of the now hand operated pump be that the wheel C is seated on the ground, the latch 39 is raised, as shown in Fig. 3 of the drawings. In this position the gear wheel 24 is manipulated without turning or endeavoring to turn the plate 22 and parts connected therewith, the plate 11 being anchored by means of a chain 59, the cylinder 29 is held while the piston 32 is reciprocated therein, the gear wheel 24 being rotated by means of the operator turning the same, with the lever 45 holding for that purpose the grip 57.

If it be desired to steady the manipulation of the hand operated pump, the wheel C may be jacked off the ground and the latch 39 dropped into engagement with the groove 41 of the plate 22 preliminary to operating the pump by means of the lever 45. When thus arranged the wheel C is revolved in unison with the gear wheel 24 and becomes a fly wheel for steadying the operation of the pump.

When the pumping mechanism is disposed as shown in Fig. 4 of the drawings, and as above described, the nipple 42 is connected by means of a pipe 81 with a passage 82 formed in the post 12. The passage 82 is extended lengthwise of the said post, having an opening at the end opposite from that which the pipe 81 is connected with, so that the pipe 43 may be connected at the end of the post adjacent the wheel C. In this manner the air as compressed in the cylinder 29 is transferred through the post 12 inside the rotary path of the plate 11 and cylinder 29.

In Figs. 5 and 6 of the drawing is shown a modified form of the invention. The modification consists primarily in that the pivot post 60 is formed integrally with the plate 61, which corresponds to the plate 13 of the structure illustrated in Figs. 1 to 4 inclusive of the drawings. Upon the pivot post 60 is pivotally mounted a bracket plate 62, resembling in function and structure the bracket plate 11. Supported by the bracket plate 62 is a pump 63, which is pivotally mounted on the plate 62 by means of a pivot screw 64. The piston rod 65 of the pump 63 is pivotally connected with a crank arm 66. The crank arm 66 is provided with a pivot cup 67, on the sides whereof are formed extensions 68, between the members whereof is formed a slot 69. The slot 69 is provided to receive a latch 70. The latch 70 is pivoted at 71 in extensions 72 corresponding in shape to those shown as 68 in Fig. 6 of the drawings. When the latch 70 is dropped to the position as shown in Fig. 5 of the drawings, a collar 73 and the pivot cup 67 are held rigidly together. The collar 73 is held by a key 74 in non-rotative relation to the post 60. The crank arm 66 and cup 67 are provided with a pivot screw 75, the screw threaded section 76 whereof is driven into a suitable perforation formed in the center of the cup 67. When so driven the pivot is secured by means of a pin 77. The outer end of the pivot screw 75 is reduced and threaded to receive a nut 78 which is held in locked position by a pin 79. The outer end of the crank arm 66 is provided with a squared extension 80. The extension 80 is provided to receive a lever for manually cranking, the lever being formed in a manner similar to the lever 45, having, instead of the connecting head shown in connection with the said lever 45 in Figs. 2 and 3 of the drawings, a squared socket of usual construction.

When the modified form shown in Figs. 5 and 6 is mounted in operative position on the driving wheel of an automobile, the plate 62 is held non-rotatively by being anchored to the body structure of the automobile or by being braced against the adjacent ground. When the pump is manually operated the hand lever corresponding to the lever 45 is connected with the squared extension 80 of the crank arm 66, the latch 70 is thrown to the position shown in dotted lines in Fig. 5, out of engagement with the pivot cup 67. The crank arm 66 may now be turned without influencing the wheel or the plate 61 which is fastened to the cap nut of the said wheel. When, however, it is desired to operate the pump by means of the wheel to which the plate 61 is connected, the manually operated lever referred to is removed and the latch 70 is thrown to the position shown in full lines in Fig. 5 of the drawings, locking thereby the collar 73 and the pivot cup 67 in holding relation. When the wheel of the automobile is rotated, the post 60 and the collar 73 are likewise rotated. When the latch 70 is thus thrown, the crank arm 66 is also rotated in unison with the said wheel to operate the piston rod 65 and the pump 63.

Having thus described my invention, what I claim as new and desire to secure by Letters Patent is:—

1. An automobile air pump comprising a pivot post; a clamp for operatively engaging said post with the cap nut of an automobile driving wheel; a supporting plate pivotally mounted on said pivot post; an operating mechanism rotatively mounted on said pivot post; an air pump embodying a cylinder and a reciprocating piston, said cylinder being mounted on said supporting plate; and a latch for operatively connecting said pivot post and said operating mechanism.

2. An automobile air pump comprising a pivot post; a clamp for operatively engaging said post with the cap nut of an automobile driving wheel; a supporting plate pivotally mounted on said pivot post; an operating mechanism rotatively mounted on said pivot post; an air pump embodying a cylinder and a reciprocating piston, said cylinder being mounted on said supporting plate; a latch for operatively uniting said pivot post and said supporting plate; and means for holding in non-rotative position said operating mechanism while the said driving wheel is rotated.

3. An automobile pump of the character specified, embodying a pivot post adapted to be rigidly attached concentrically upon the driving wheel of the automobile; a supporting frame rotatively mounted on said post; means for maintaining said supporting frame in arrested position; a reciprocating air pump mounted on said supporting plate; a manually operated driving wheel rotatively mounted on said post; and a translating mechanism operatively connecting the reciprocating member of said pump and said driving wheel for converting the rotary motion of said driving wheel to a reciprocating motion in said pump.

4. An automobile pump of the character specified, embodying a pivot post adapted to be rigidly attached concentrically upon the driving wheel of the automobile; a supporting frame rotatively mounted on said post; means for maintaining said supporting frame in arrested position; a reciprocating air pump mounted on said supporting plate; a driving wheel rotatively mounted on said post; an auxiliary handle adapted to holdingly engage said driving wheel; and a translating mechanism operatively connecting the reciprocating member of said pump and said driving wheel for converting the rotary motion of said driving wheel to a reciprocating motion in said pump.

5. An automobile pump of the character specified, embodying a pivot post adapted to be rigidly attached concentrically upon the driving wheel of the automobile; a supporting frame rotatively mounted on said post; means for maintaining said supporting frame in arrested position; a reciprocating air pump mounted on said supporting plate; a manually operated driving wheel rotatively mounted on said post; a translating mechanism operatively connecting the reciprocating member of said pump and said driving wheel for converting the rotary motion of said driving wheel to a reciprocating motion in said pump; and locking means for uniting the said pivot post and said driving wheel to rotate the driving wheel of the automobile in unison with said driving wheel.

In testimony whereof I have signed my name to this specification in the presence of two subscribing witnesses.

ANTOINE M. CLÉMENT.

Witnesses:
E. F. MURDOCK,
JOHN P. DAVIS.

Copies of this patent may be obtained for five cents each, by addressing the "Commissioner of Patents, Washington, D. C."